3,483,207
UNSYMMETRICAL BIS-THIOSEMICARBAZONES
Erhardt Winkelmann, Kelkheim, Taunus, and Wolf-Helmut Wagner, Frankfurt am Main, Germany, assignors to Farbwerke Hoechst Aktiengesellschaft vormals Meister Lucius & Bruning, Frankfurt am Main, Germany, a corporation of Germany
No Drawing. Filed Feb. 13, 1967, Ser. No. 615,335
Claims priority, application Germany, Feb. 19, 1966,
F 48,483
Int. Cl. C07d *27/04;* C07c *159/00;* A61k *21/00*
U.S. Cl. 260—293.4                                3 Claims

ABSTRACT OF THE DISCLOSURE

Unsymmetrical bis-thiosemicarbazones, active against coccidiosis, having the formula:

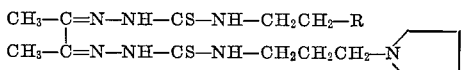

wherein R is diethylamino or piperidino. Methods for making these compounds.

---

It has already been proposed to prepare basically substituted bis-4-alkyl-thiosemicarbazones of diacetyl of the general formula

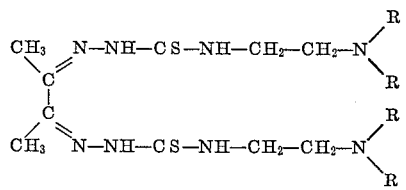

in which R represents the methyl or ethyl radical, or the group NRR represents the pyrrolidino, piperidino or the 2-methyl-piperidino group. These compounds are active against poultry coccidiosis in vivo (*Eimeria tenella*) as has been stated subsequently in Nature, vol. 206, 1340 (1965).

It has been found that special unsymmetrically and basically substituted bis-thiosemicarbazones have a surprisingly greater chemo-therapeutical breadth than do the known compounds and that, therefore, they are extremely suitable for use against poultry coccidiosis. Therefore, the present application relates to basically substituted bis-thiosemicarbazones of the Formula I

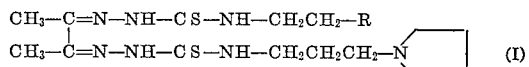 (I)

in which R represents a diethylamino or a piperidino group. These compounds are prepared by processes in which (a) a mono-thiosemicarbazone of the Formula II

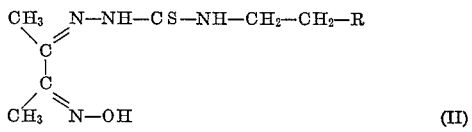 (II)

is reacted with the thiosemicarbazide of Formula III

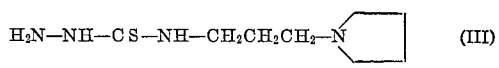 (III)

or the mono-thiosemicarbazone of the Formula IV

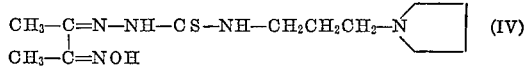 (IV)

is reacted with a thiosemicarbazide of the Formula V $$H_2N-NH-CS-NH-CH_2-CH_2-R \quad (V)$$

if desired, in the presence of acids; or (b) a mono-thiosemicarbazone of the Formula VI

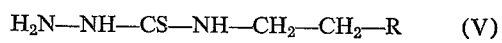 (VI)

is reacted with mustard oil of the Formula VII

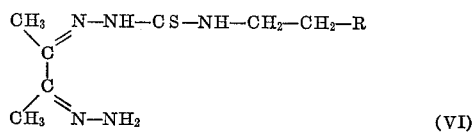 (VII)

or the mono-thiosemicarbazone of the Formula VIII

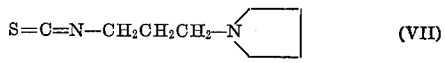 (VIII)

is reacted with a mustard oil of the Formula IX $$S=C=N-CH_2-CH_2-R$$

in which R has the meaning given above, and the bases obtained from the salts are isolated, if desired, in usual manner or the bases obtained are treated with acids.

Substituted bis-thiosemicarbazones of diketones are already known from Austrian Patent No. 225,715 as well as from Nature, vol. 206, page 1340ff (1965).

The two products of the present invention have hitherto, however, not been described. Unsymmetrical and basically substituted diacetyl-bis-thiosemicarbazones have not become known until now.

The special advantage of the products of the present invention is that they are extremely suitable for routine prophylaxis of poultry coccidiosis on account of their advantageous properties (low toxicity). This, however, is not the case with the hitherto known basically substituted bis-thiosemicarbazones (cf. Nature, vol. 206, page 1341 right column, lines 30–34).

The mustard oils or the thiosemicarbazides used as starting substances are: 2-diethylaminoethyl-2-piperidino-ethyl- and 3-pyrrolidinopropyl-mustard oil or 3-pyrrolidinopropyl-thiosemicarbazide.

The mustard oils are prepared in usual manner from the amines by reacting with carbon disfulfide and subsequently oxydizing the dithiocarbamates formed during the first step with sodium chlorite ($NaClO_2$). The corresponding thiosemicarbazides are also obtained in known manner by reacting the mustard oils with molar amounts of hydrazine-hydrate at low temperatures.

The mono-thiosemicarbazone-mono-oximes of Formula II used as starting substances according to (a) can be prepared, for example, by reacting isonitroso-methylethyl-ketone and thiosemicarbazides of Formula V with each other in equimolar amounts. The reaction of the isonitroso-methylethylketone with the thiosemicarbazide of Formula V is carried out advantageously at room temperature in order to avoid a double reaction of the thiosemicarbazide to form the symmetrical bis-thiosemicarbazone.

The mono-thiosemicarbazone-mono-oximes of Formula II used as starting substances according to (a) can, furthermore, be prepared by reacting equimolar amounts of a mustard oil of Formula IX and a diacetyl-mono-hydrazone-mono-oxime.

The mono-thiosemicarbazone-mono-oxime thus obtained is reacted with 1 mole of the thiosemicarbazide of the Formula III to give the bis-thiosemicarbazone (I) according to the process of the present invention (a). When reacting it is advantageous to use, generally, a solvent or a dispersing agent. Preferably, working is carried out in a 5- to 20-fold amount of an organic solvent, especially lower alcohols such as methanol, ethanol, propanol, isopropanol, butanol, isobutanol, methoxyethanol or ethoxyethanol. The reaction of the thio-semicarbazide of Formula III with the mono-oxime of Formula II can be carried out between room temperature and the boiling point of the respective solvent used, advantageously at 60–90° C. The reaction period may range from 15 minutes to several hours depending on the conditions and temperatures.

The preparation of the products of the invention is carried out correspondingly by starting from the mono-thiosemicarbazone of Formula IV, prepared from isonitroso-methylethylketone and the thiosemicarbazide of Formula III or from diacetyl-mono-hydrazone-monooxime and mustard oil of the Formula VII, and reacting it with a thiosemicarbazide of the Formula V in the manner described above.

Condensation can be carried out without using a catalyst but the presence of catalytic amounts of an acid is of great advantage, as otherwise the condensation reaction is carried out much more slowly and incompletely. As acids can be used: lower fatty acids such as formic acid or acetic acid, or mineral acids such as sulfuric acid, phosphoric acid, and hydrogen halides, preferably hydrochloric acid. As basically substituted thiosemicarbazides are reacted, molar amounts of acids are used for neutralisation. Even a further small excess of acid is sufficient to achieve condensation in excellent yields. The hydrochloric acid can be used in alcoholic or aqueous solution in optional concentrations. On account of the good solubility of the products of the invention precipitating as salts (hydrochlorides), it is advantageous to use half-strength or concentrated aqueous hydrochloric acid. The hydrochloric acid can be added after combination of the reaction components, but it is, however, advantageously added directly to the solution or suspension of the thiosemicarbazide. Generally, the desired products of the invention crystallize after a few minutes as di-hydrochlorides in pure form and can be recrystallized, if desired, from the appropriate solvents such as aqueous alcohols.

The mono-thiosemicarbazone-mono-hydrazones of Formula VI used for the process of the present invention can be prepared by allowing 1 mole of a mustard oil of Formula IX to react with 1 mole of diacetyl-dihydrazone.

The reaction of the mono-hydrazone of Formula VI, which is formed during this process, with the mustard oil of Formula VII according to (b) can be carried out by simply heating the components, but it is generally advantageous to use also a solvent or a dispersing agent as has been described under (a).

In a similar fashion the mono-thiosemicarbazone of Formula VIII, prepared in analogous manner from diacetyldihydrazone and mustard oil of the Formula VII, is reacted with a mustard oil of Formula IX.

The reaction periods may range between a few minutes and several hours depending on the conditions and temperatures. The reaction can be carried out advantageously by reacting the mustard oils IX and VII one after the other, without isolation of the mono-thiosemicarbazone-mono-hydrazones VI or VIII. The process is carried out, for example, by exothermically dissolving diacetyl-dihydrazone in a 20-fold amount of an alcohol and adding an equimolar amount of mustard oil, dissolved in alcohol, dropwise while refluxing on a steam bath. The mono-thiosemicarbazone-mono-hydrazone often crystallizes from the warm mixture. It can be isolated by filtration with suction and submitted directly to further reaction. Further reaction is carried out by dissolving the mono-thiosemicarbazone by heating in an appropriate alcohol, adding the equimolar amount of the second mustard oil, and heating in a steam bath for 1–3 hours depending on the reactive action of the mustard oil. The product of the invention desired crystallizes in most cases when the reaction mixture is cooled or when the reaction solution is concentrated, and can be clarified, if desired, by recrystallization from an appropriate solvent, for example ethanol. The isolation of the product of the invention can also be carried out by transforming it into an acid addition salt, for example into a hydrochloride.

The new products of the invention can be used as medicaments. They are especially suitable for the therapy and prophylaxis of poultry coccidiosis on account of their favorable chemotherapeutical index and can be added to drinking water or animal food. For example, an administration of 0.0025–0.01% of the product of the invention in food gives sure results and is well tolerated over a period of several weeks. The following Tables 2 (toxicity) and 1 (activity) show the superiority of the products of the invention I and II in comparison to an unsymmetrical compound (III) having a similar structure and the symmetrically and basically substituted bis-thiosemicarbazone IV is, as is evident from the index of the postmortem result.

Tables 1 and 2 relate to drinking water tests of the tolerance and therapeutic activity of the substances in chickens infected with coccidiosis.

The drinking water tests of therapeutic activity were carried out by infecting each of a number of few-day-old chickens (white Leghorn) with 100,000 spored oocysts of *Eimeria tenella* via the esophageal sound. The equally-infected animals were divided into groups of at most 10 chickens. These groups were either treated in common for the time shown in Table 1 or served as infected non-treated control groups. The infection was such that all infected control animals died with cecum coccidiosis within the test period: these results are not shown in Table 1. Treatment was for 48 hours and started immediately after infection. The solution was renewed once. During the two-day period the test animals could drink ad libitum the water to which the preparation was added. During the test the animals were examined for oocyst secretion, and it was determined whether the deaths occurring were caused by coccidiosis or were for other reason. At the end of the test, an autopsy of the surviving animals was carried out and the degree of infection, expressed as a numerical value from 0–8, was determined. The values in Table 1 are the average value of the degree of infection for the number of animals respectively involved.

The test of tolerance was performed by giving the substance in drinking water also to non-infected animals, the drinking water containing the preparation being at the animals' disposal for five days under these test conditions. The chickens used for the tolerance test belonged to the same species as those used for the therapeutical tests.

The test period amounted to at least 3 weeks so that the observation period was long enough. The first administration of the drinking water containing the preparation was carried out at the beginning of this test period. The rates of survival given in the tables were determined at the end of the three weeks' observation period. Comparative compounds:

(I) diacetyl-mono-(2-diethylamino-ethyl-thiosemicarbazone) - mono-3(pyrrolidinopropylthiosemicarbazone) (=cf. Example 1)

(II) diacetyl - mono-(2-piperidinoethyl - thiosemicarbazone) - mono - (3 - pyrrolidino-propyl-thiosemicarbazone) (=cf. Example 2)

(III) diacetyl - mono-(2-diethylamino-ethyl-thiosemicarbazone) - mono - (3-diethylamino-propyl-thiosemicarbazone)=unsymmetrical compound having similar structure (IV) diacetyl-bis-(2-dimethylamino-ethyl-thiosemicarbazone)=symmetrical compound having similar structure (cf. Nature, 206, 1340 (1965)).

The compounds I–IV were used in a solution combined with hydrochlodic acid.

TABLE 1.—COCCIDIOSIS ACTIVITY (INFECTED ANIMALS)

| Preparation: | Period of administration in days | Concentration in drinking water in percent | Survival/ death | Post mortem result index 0-8 |
|---|---|---|---|---|
| Test animals | | | 0/10 | |
| I | 2 | 0.03 | 10/10 | 1.0 |
| II | 2 | 0.03 | 10/10 | 0.1 |
| III | 2 | 0.03 | 9/10 | 5.0 |
| IV | 2 | 0.03 | 9/10 | 4.8 |

TABLE 2.—TOXICITY (NON-INFECTED ANIMALS)

| Preparation: | Period of administration in days | Concentration in drinking water in percent | Survival/ death |
|---|---|---|---|
| I | 5 | 0.03 | 9/10 |
| II | 5 | 0.03 | 9/10 |
| III | 5 | 0.03 | 10/10 |
| IV | 5 | 0.03 | 0/10 |

The values of Tables 1 and 2 show that the products of the invention I and II in comparison to the chemically similar compounds III and IV have a much better tolerance. This, on the one hand, is evident from the postmortem result on Table 1. On the other hand, the weak toxicity becomes evident from Table 2, in particular with regard to the compound IV in the non-infected animals.

Since the products of the invention I and II have a considerably higher coccidiosis activity, and a much better tolerance, as is shown in the above tables, they are considerably superior to the compounds III and IV as regards the chemo-therapeutical indices.

The following examples serve to illustrate the invention but they are not intended to limit it thereto.

EXAMPLE 1

Diacetyl - mono - (2 - diethylaminoethyl-thiosemicarbazone)-mono-(3-pyrrolidino-propylthiosemicarbazone)

30.9 grams (0.1 mole) of diacetyl-mono-(2-diethyl-aminoethylthiosemicarbazone) - mono-oxime-hydrochloride are suspended in 150 cc. of ethanol and such an amount of water is added until clear solution has formed. To this solution, a solution of 20.2 grams (0.1 mole) of 3-pyrrolidinopropyl-thiosemicarbazide is added in 150 cc. of ethanol and 22 cc. of aqueous concentrated hydrochloric acid and the reaction mixture is heated for three hours in a steam bath under reflux. After cooling, the solution is adjusted to a pH of 7.5 by adding dropwise dilute ammonia, while stirring. The precipiated product is filtered off with suction, washed with water, ethanol and ether and dried in a steam bath.

31.5 grams=71% of the theory of diacetyl-mono-(2-diethyl - amino-ethylthiosemicarbazone)-mono - (2-pyrrolidinopropyl-thiosemicarbazone) are obtained as yellowish crystalline powder (melting point 152° C.). The product can be recrystallized from ethanol.

$C_{19}H_{38}N_8S_2$ (molecular weight 442). Cal.: N, 25.3%; S, 14.5%. Found: N, 25.3%; S, 14.5%.

The diacetyl-mono-(2 - diethyl-aminoethyl-thiosemicarbazone)-mono-oxime-hydrochloride was prepared by reacting 10.1 grams (0.1 mole) of isonitrosomethyl-ethylketone (melting point 76° C.), dissolved in 40 cc. of ethanol, and 19.0 grams (0.1 mole) of 2-diethylaminoethyl-thiosemicarbazide (melting point 85–87° C.) dissolved in 66 cc. of ethanol and 10 cc. of aqueous concentrated hydrochloric acid at room temperature. The desired product soon crystallizes out from the solution, is filtered off with suction, washed with cold ethanol and ether and dried in a steam bath.

27.8 grams=90% of the theory of diacetyl-mono-(2-diethyl - amino - ethyl-thiosemicarbazone)-mono-oxime-hydrochloride are obtained as yellowish crystalline powder (melting point 211° C.) under decomposition.

The diacetyl-mono-(2 - diethyl-aminoethyl-thiosemicarbazone)-mono-oxime used as starting substance can be prepared by boiling for 1 hour a solution of 11.5 grams (0.1 mole) of diacetyl-mono-hydrazone-mono-oxime (melting point 140° C.) in 50 cc. of ethanol and 15.8 grams (0.1 mole) of 2-diethylaminoethyl mustard oil. After cooling of the reaction solution and addition of a small amount of cyclohexane, the compound crystallizes, is filtered off with suction, washed with cold ethanol and ether and dried. Yield: 24.5 grams=29% of the theory (melting point 192° C.).

EXAMPLE 2

By reaction of 32.2 grams (0.1 mole) of diacetyl-mono-(3 - pyrrolidinopropyl - thiosemicarbazone)-mono-oxime-hydrochloride and 19.0 grams (0.1 mole) of diethyl-aminoethyl-thiosemicarbazide under the same conditions as described in Example 1, there are obtained after analogous working up, 33 grams=75% of the theory of diacetyl - mono - (2-diethyl-aminoethyl)-thiosemicarbazone) - mono - (3 - pyrrolidinopropylthiosemicarbazone). The substance (melting point 153° C.) was identical with the compound prepared according to Example 1.

The diacetyl-mono-(3-pyrrolidino-propyl-thiosemicarbazone)-mono-oxime-hydrochloride used as starting substance was prepared by reacting 10.1 grams (0.1 mole) of isonitrosomethylethylketone and 20.2 grams (0.1 mole) of 3-pyrrolidino-propylthiosemicarbazide (tough oil) in an analogous manner described in Example 1. 21.2 grams=66% of the theory are obtained as yellowish crystalline powder (melting point 187° C.) under decomposition.

The base precipitated by dissolving in water and decomposing with dilute ammonia has a melting point of 167–168° C.

The diacetyl-amino-(3-pyrrolidino-propylthiosemicarbazone)-mono-oxime used as starting substance can be prepared as given in Example 1 by boiling for 1 hour a solution of 11.5 grams (0.1 mole) of diacetyl-mono-hydroazone-mono-oxime and 17.0 grams (0.1 mole) of 3-pyrrolidino-propyl-mustard oil. Yield: 23.5 grams=73% of the theory, melting point 167° C.

EXAMPLE 3

27.2 grams (0.1 mole) of diacetyl-mono-(2-diethyl-amino-ethyl-thiosemicarbazone)-mono-hydrazone are dissolved in 88 cc. of ethanol by heating and 17.0 grams (0.1 mole) of 3-pyrrolidinopropyl-mustard oil are added and the whole is heated under reflux in a steam bath for 3 hours. The reaction solution is evaporated under reduced pressure to ⅓ of the total volume and the final product is separated by adding ether. It is filtered off with suction, recrystallized from ethanol, filtered off with suction, washed with cold ethanol and ether and dried in a steam bath. 35 grams=79% of the theory of diacetyl-mono - (2-diethyl-amino-ethylthiosemicarbazone)-mono-3-pyrrolidinopropyl-thiosemicarbazone) are obtained. The substance was identical to the compound prepared according to Example 1.

The diacetyl-mono-(2-diethyl-amino-ethyl-thiosemicarbazone)-mono-hydrazone used as starting substance was prepared by slowly adding dropwise (about 1 hour) a solution of 15.8 grams (0.1 mole) of 2-diethylamino-ethyl-mustard oil boiling at 70–72° C. under pressure of 1 mm. of mercury in 25 cc. of ethanol to a boiling solution of 11.4 grams (0.1 mole) of diacetyl-dihydrazone (melting point 164° C.) in 150 cc. of ethanol. When everything is added, boiling under reflux is continued for 15 minutes, then the mixture is cooled and filtered off with suction from small amounts of precipitating biscompound. The filtrate is evaporated under reduced pressure to a quarter of the total volume and the desired product is separated by adding ether. The product is filtered off with suction, recrystallized from benzene, filtered off with suction, washed with cold ethanol and ether and dried in an exsiccator. 20 grams=73% of the theory of diacetal-mono-(2-diethylamino-ethyl-thiosemicarbazone)-mono-hydrazone are obtained as yellowish crystalline powder (melting point 115–117° C.).

The diacetyl-mono-(2-diethyl-amino-ethyl-thiosemicarbazone)-mono-hydrazone used as starting substance can also be prepared by boiling for 2 hours a solution of 11.5 grams (0.1 mole) of diacetyl-mono-hydrazone-monooxime in 50 cc. of ethanol and 19.0 grams (0.1 mole) of 2-diethyl-aminoethyl-thiosemicarbazide in 77 cc. of ethanol and 22 cc. of aqueous concentrated hydrochloric acid. After cooling, the reaction solution is adjusted to a pH of 7.5 by adding dilute ammonia in portions, the compound is precipitated, filtered with suction, washed with water, cold ethanol and ether and dried. Yield: 70% of the theory. Melting point 130–132° C.

EXAMPLE 4

By reaction of 28.4 grams (0.1 mole) of diacetyl-mono-(3 - pyrrolidino - propyl-thiosemicarbazone)-mono-hydrazone and 15.8 grams (0.1 mole) of 2-diethyl aminoethyl-mustard oil under the same conditions as described in Example 3, there are obtained after analogous working up 37 grams=84% of the theory of diacetyl-mono-(2-diethylamino - ethylthiosemicarbazone) - mono - (3 - pyrrolidinopropylthiosemicarbazone) (melting point 149–151° C.).

The diacetyl-mono-(3-pyrrolidino-propylthiosemicarbazone)-mono-hydrazone used as starting substance was prepared by reacting 17.0 grams (0.1 mole) of 3-pyrrolidinopropyl-mustard oil boiling at 87–90° C. under a pressure of 1 mm. of mercury and 11.4 grams (0.1 mole) of diacetyl-dihydrazone as described in Example 1. 22 grams=76% of the theory are obtained as yellowish crystalline powder (melting point 127–128° C.).

The diacetyl-mono-(3-pyrrolidino-propylthiosemicarbazone)-mono-hydrazone can also be prepared by boiling for 2 hours a solution of 11.5 grams (0.1 mole) of diacetyl-mono-hydrazone-mono-oxime and 20.2 grams (0.1 mole) of 3-pyrrolidinopropylthiosemicarbazide as described in Example 1. Yield: 67% of the theory, melting point: 126–127° C.

EXAMPLE 5

Diacetyl-mono-(2-piperidinoethyl-thiosemicarbazone)-mono-(3-pyrrolidinopropyl-thiosemicarbazone)

28.1 grams (0.1 mole) of diacetyl-mono-(3-pyrrolidinopropyl-thiosemicarbazone)-mono-hydrazone and 17.0 grams (0.1 mole) of 2-piperidinoethyl-mustard oil boiling at 84–86° C. under a pressure of 1 mm. of mercury are reacted under the same conditions as described in Examples 3 and 4 and then isolated.

35 grams=77% of the theory of diacetyl-mono-(2-piperidino - ethyl - thiosemicarbazone) - mono-(3-pyrrolidino-propyl-thiosemicarbazone) are obtained in the form of yellowish crystals having a decomposition point of 224–225° C.

$C_{20}H_{38}N_8S_2$ (molecular weight 454). Cal.: N, 24.7%; S, 14.1%. Found: N, 24.6%; S, 14.3%.

By dissolving the base in 40 times the amount of ethanol and by adding an equivalent amount (2 moles per mole of base) of aqueous concentrated hydrochloric acid, the dihydrochloride is obtained in practically quantitative yield as light yellow crystalline powder having a decomposition point of 211° C.

We claim:
1. A bis-thiosemicarbazone of the formula:

CH₃—C=N—NH—CS—NH—CH₂CH₂—R
  |
CH₃—C=N—NH—CS—NH—CH₂CH₂CH₂—N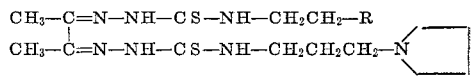

wherein R is diethylamino or piperidino.

2. Diacetyl - mono - (2-diethylamino-ethylthiosemicarbazone)-mono-(3-pyrrolidinopropyl thiosemicarbazone).

3. Diacetyl - mono - (2-piperidino-ethyl thiosemicarbazone)-mono-(3-pyrrolidinopropyl-thiosemicarbazone).

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 3,232,933 | 2/1966 | Gündel | 260—552 |
| 3,242,208 | 3/1966 | Martin | 260—552 |

HENRY R. JILES, Primary Examiner

S. D. WINTERS, Assistant Examiner

U.S. Cl. X.R.

260—326.8, 454, 552; 424—267, 274

Disclaimer 3,483,207.—*Erhardt Winkelmann*, Kelkheim, Taunus, and *Wolf-Helmut Wagner*, Frankfurt am Main, Germany. UNSYMMETRICAL BIS-THIOSEMICARBAZONES. Patent dated Dec. 9, 1969. Disclaimer filed Sept. 18, 1970, by the inventors; the assignee, *Farbwerke Hoechst Aktiengesellschaft vormals Meister Lucius and Bruning*, consenting.

Hereby disclaim the terminal portion of the term of the patent subsequent to Nov. 11, 1986.

[*Official Gazette November 17, 1970.*]